INVENTORS.
Joseph A. Castellano and
Ronald N. Friel
BY M. Y. Epstein
ATTORNEY

United States Patent Office 3,674,342
Patented July 4, 1972

3,674,342
LIQUID CRYSTAL DISPLAY DEVICE INCLUDING SIDE-BY-SIDE ELECTRODES ON A COMMON SUBSTRATE
Joseph Anthony Castellano, North Brunswick, and Ronald Norman Friel, Hamilton Square, N.J., assignors to RCA Corporation
Filed Dec. 29, 1970, Ser. No. 102,388
Int. Cl. G02f 1/00; G09f 11/00; G08b 23/00
U.S. Cl. 350—160 R                        4 Claims

ABSTRACT OF THE DISCLOSURE

A pair of oppositely disposed substrates sandwich a film of liquid crystal material therebetween. Side by side electrodes, between which a voltage is applied to switch the light transmitting characteristics of the liquid crystal material, are disposed on a single one of the substrates.

BACKGROUND OF THE INVENTION

This invention relates to liquid crystal display devices.

One type of known liquid crystal display device comprises a pair of oppositely disposed substrates sandwiching a liquid crystal material therebetween. Disposed on the inner surface of each of the substrates are one or more electrodes. Various electrodes on the two substrates overlap one another.

With one type of liquid crystal material, the material is normally transparent to light. When a voltage is applied across the material, via overlapped electrodes on the two substrates, the liquid crystal material becomes light scattering. The amount of scattering is dependent, up to a maximum amount of scattering, upon the strength of the electric field through the material. When the voltage is removed, the liquid crystal material returns to its transparent state. The time required for the liquid crystal material to return from a light scattering state to the transparent state, known as the "relaxation time" of the device, is dependent upon the particular liquid crystal material used and upon the quantity of liquid crystal material between the overlapped electrodes, i.e. upon the spacing between the overlapped electrodes.

One problem with such devices is that because both the amount of light scattering and the relaxation time are dependent upon the spacing between the electrodes (the spacing between the electrodes determining the electric field through the material, for a given voltage), the spacing between the device substrates, on which the electrodes are disposed, is of critical importance. Thus, with large area devices, for example, it is difficult, owing to such factors as sag of the substrates and variations in the thickness thereof, to maintain a uniform spacing between the two substrates over the entire extent of the device.

Additionally, in order to obtain a short relaxation time, with the prior art devices, the distance between the overlapped electrodes should be small. With extremely small substrate spacings, however, the danger of shorting together the overlapped electrodes is increased.

Also, while small substrate spacings are desired in the prior art devices for fast device operation, it is found that the lifetime of the devices is directly dependent upon the amount of liquid crystal material present in the device, i.e., longer device lifetimes are obtained with larger substrate spacings. Thus, in the design of the prior art devices, a compromise must often be made between the desired device lifetime and the desired relaxation time.

DESCRIPTION OF PREFERRED EMBODIMENTS

Figure 1:
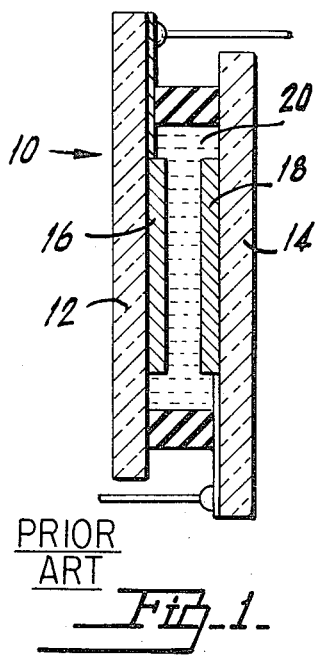
FIG. 1 is a side view, in section, of a prior art liquid crystal display device.

Shown in FIG. 1 is an example of a prior art liquid crystal device. The device 10 comprises a pair of oppositely disposed substrates 12 and 14, each substrate 12 and 14 being provided with an electrode 16 and 18, respectively, on the inside surface thereof. The two electrodes 16 and 18 overlap one another (i.e. are disposed opposite each other across the gap between them), and provide means by which a voltage can be applied through a film 20 of liquid crystal material between the substrates. A limitation on this prior art construction, as previously noted, is that, owing to dimensional variations, in order to avoid touching and shorting together of the overlapped electrodes 16 and 18, a minimum spacing, e.g., in the order of ¼ mil between the substrates 12 and 14, must be provided. This minimal spacing, for a given liquid crystal material, provides a limitation on the minimal relaxation time obtainable with the prior art devices. Also, providing closely spaced substrates for reduced relaxation time results in devices having reduced lifetime.

Figure 2:
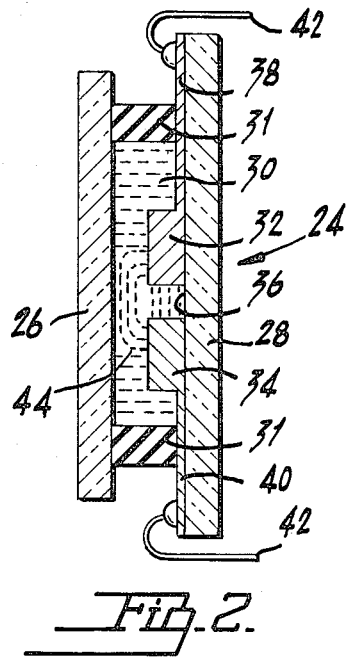
FIG. 2 is a view similar to that of FIG. 1 but showing a device in accordance with the instant invention.

As shown in FIG. 2, a liquid crystal device 24 in accordance with the instant invention comprises a pair of oppositely disposed flat substrates 26 and 28 of, for example, glass, sandwiching a film 30 of a known liquid crystal material therebetween. The substrates 26 and 28 are maintained in spaced apart and sealed together relation by means of a shim 31 of, e.g., a plastic material.

Two electrodes 32 and 34 are provided by means of which a voltage can be applied to the device to alter or "switch" the light transmitting characteristics of the liquid crystal material. That is, depending upon the liquid crystal material used, the liquid crystal material is either normally transparent and is switchable to a light scattering state by the application of a voltage thereacross, or the liquid crystal material is normally light scattering and is switchable to a light transparent state by the application of the voltage. Examples of various liquid crystal materials having utility in accordance with the instant invention are described in U.S. Pat. 3,499,112, issued to Heilmeier et al. on Mar. 3, 1970, and 3,322,485, issued to Williams on May 30, 1967.

Figure 3:
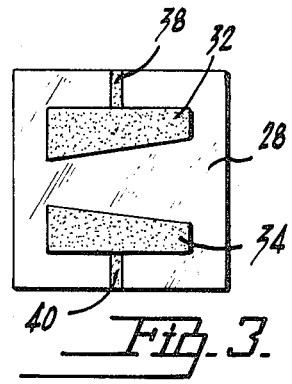
FIG. 3 is a front view of a portion of the rear substrate of the device shown in FIG. 2 and showing the arrangement of the electrodes on the substrate.

As shown in FIGS. 2 and 3, the two electrodes 32 and 34 are disposed in side by side relation on the inside surface 36 of the substrate 28. The electrodes 32 and 34 comprise thin films of a transparent electrically conductive material, e.g., a $\frac{1}{25}$ mil. thick film of indium oxide or tin oxide. Also, two connectors 38 and 40, also of a transparent conductive material are disposed on the surface 36 and extend from each of the electrodes 32 and 34, respectively, to exposed peripheral surfaces of the substrate 28, where terminals 42 are soldered to the connectors.

When a voltage is applied between the two electrodes 32 and 34 via the two terminals 42, an electric field, as indicated by the use of dashed lines 44 representative of some of the electric field lines, is provided through the liquid crystal film 30 between the electrodes 32 and 34. As shown, the electric field lines 44 fringe outwardly and away from the two electrodes 32 and 34, and, depending upon the dimensions of the device, the liquid crystal material used, and the voltage applied, a portion of the liquid crystal film 30 adjacent to and between the two electrodes 32 and 34 is switched to its alternate light-transmitting or light-scattering state. Owing to the different optical characteristics of this "switched" portion of the film, in comparison with the unaltered optical characteristics of unswitched adjacent portions of the film 30, the two portions are optically distinguishable from each other by a viewer. By suitable shaping of the two electrodes 32 and 34, an image can be displayed.

The use of the switching of the optical states of liquid crystal materials to provide displays is well known. Also, in general, the various techniques for providing displays using prior art liquid crystal devices can be used with the instant invention. Various ones of such techniques, such as those relating to the choice of device materials, the light transmitting or reflecting properties of the electrodes and substrates, the device illumination, and the electrical addressing of the devices are described in the aforementioned U.S. patents. Also, while the device electrodes can be disposed in direct contact with the liquid crystal material film, as hereinshown, the electrodes can be disposed in spaced relation to the film. For example, the electrodes can be coated with a dielectric material, such as silicon dioxide, and the device operated with an alternating voltage which is capacitively coupled to the liquid crystal material through the dielectric material.

Possible differences in operation of the hereindescribed devices, in comparison with the operation of prior art devices, however, arises from the fact that, in the prior art devices, substantially all the bulk of the liquid crystal material disposed between the overlapped electrodes is uniformly "activated" or "switched" when a voltage is applied between the electrodes. This occurs because the spacings between the overlapped electrodes are substantially uniform, within the tolerance of the device, over the entire extent of the device. Thus, for a given voltage applied between overlapped electrodes, the electric field through the liquid crystal material between the electrodes is substantially uniform. With the hereindescribed devices, however, the strength of the electric field through the liquid crystal material, for a given applied voltage, can be easily made to vary over the extent of the device. An example of this is shown in FIG. 3.

As shown in FIG. 3, the two side by side electrodes 32 and 34 have a varying spacing therebetween. Since the electrical field between the two electrodes is inversely related to the distance between the electrodes, the response of the liquid crystal material to a voltage applied between the two electrodes 32 and 34 can be made to vary along the length of the electrodes. Thus, for example, if the liquid crystal material is one, such as p-methoxybenzylidene-p'-aminobutylbenzene, in which the amount of light scattering is proportional, up to a maximum value, to the electric field through the liquid crystal material, using an applied voltage insufficient to cause maximum light scattering along the entire length of the electrodes results in a light scattering which varies along the electrode length.

Figure 4:
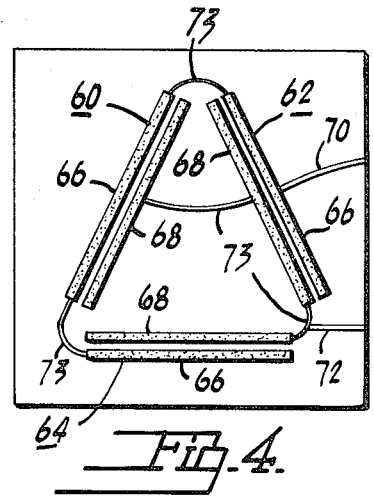
FIGS. 4 and 5 are views similar to that of FIG. 3 but showing different embodiments of the invention.

In another embodiment of the invention, illustrated in FIG. 4, a plurality of electrode pairs 60, 62, and 64, each comprising two side by side electrodes 66 and 68, are arrayed to outline a figure, a triangle, in the instant embodiment. By applying a voltage between the electrodes of each of the electrode pairs, via connectors 70 and 72, a triangle is displayed. The width of the triangle sides, corresponding to the amount of liquid crystal material activated by each electrode pair, is dependent upon the spacing between the electrodes 66 and 68 of each electrode pair and upon the amplitude of the voltage used.

To reduce the number of terminals connected to the device, it is convenient, as shown in FIG. 4, to electrically connect the various electrode pairs in parallel relation. This is done using the connectors 73. So that the connectors do not cause switching of the liquid crystal material, the various connectors are spaced relatively far apart from one another.

Figure 5:
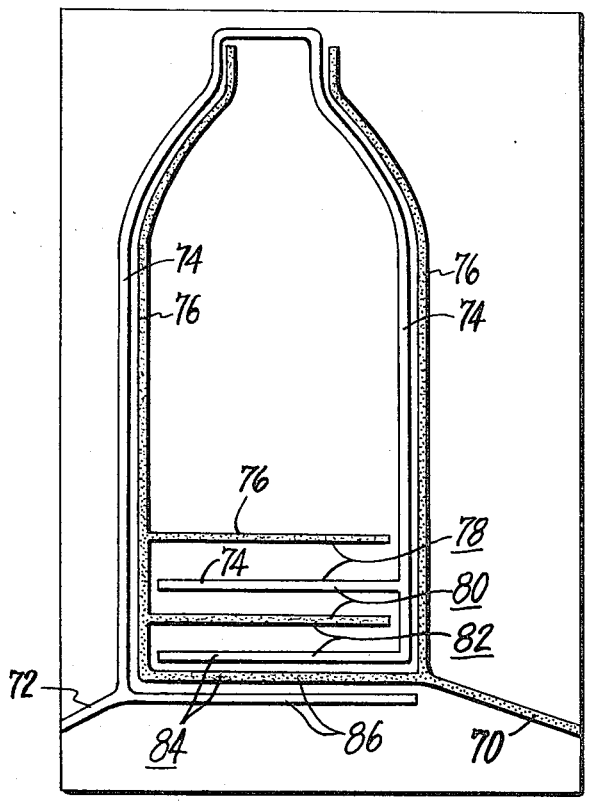

In another embodiment of the invention, as shown in FIG. 5, fine detail, of an image of a bottle, in this embodiment, is provided by utilizing a pair of electrodes 74 and 76 to define the sides and top of the bottle, and a plurality of electrode pairs 78, 80, 82, 84, and 86 to define the lower end of the bottle. Also, the number of individual electrodes required is reduced by interdigitating the various electrode pairs and utilizing certain ones of the electrodes 74 and 76 in common for adjacent electrode pairs.

The embodiment shown in FIG. 5 also illustrates a further possible mode of operation of devices made in accordance with the instant invention. As shown, the spacing between the electrodes 74 and 76 of each electrode pair forming the lower end of the bottle is uniform along the length of the electrodes, but the spacing between the various ones of these electrodes varies from electrode pair to electrode pair. In this embodiment, the spacing between the electrodes of the lower end of the bottle increases with distance from the bottom of the bottle.

In operation, a voltage having a time-dependent amplitude, e.g., a saw tooth wave voltage, is used, the low amplitude voltage of the wave being sufficient to activate only the liquid crystal material adjacent to the electrode pair of closest electrode spacing, i.e., the outline of the bottle, and the high amplitude voltage of the wave being sufficient to activate the liquid crystal material adjacent to the electrode pair of greatest electrode spacing. Thus, as the voltage, which is simultaneously applied to all the electrode pairs, via the connectors 70 and 72, increases in amplitude, the liquid crystal material portions adjacent to the electrode pairs are sequentially activated upwardly from the bottom of the bottle. Thus, an animated display of a bottle being filled is provided.

An advantage of this last described mode of operation is that the animation sequence of various displays can be controlled by wave shaping of the applied voltage. In some instances, this is more simple than the known technique of the use of switching circuits for sequentially applying voltages to different electrode pairs.

The use of side by side electrodes in place of the overlapped electrodes of the prior art provides several advantages.

As in the prior art devices, the device relaxation time of the hereindescribed devices is largely dependent upon the spacing between the device electrodes. With the prior art overlapped electrodes, however, close control of the spacing between the substrates is required to avoid shorting of the electrodes and significant variations in the spacing of the electrodes over the extent of the device. With the side by side electrodes of the instant invention, conversely, the spacing between the two substrates is not critical since the spacing between the substrates does not affect the spacing between the electrodes.

Also, while it is found that the spacing between the substrates of the hereindescribed devices does appear to affect the device relaxation time, the effect thereof is small in comparison with the affect on the relaxation time provided by the electrode spacing. Thus, devices having short relaxation times can be obtained using relatively closely spaced electrodes and relatively widely spaced apart substrates. Widely spaced apart substrates, as previously noted, provide increased lifetime.

One result of the use of side by side electrodes is that much shorter relaxation times than would be expected are obtained. For example, in one series of tests comparing devices having overlapped electrodes with a spacing of ½ mil therebetween with devices having side by side electrodes spaced apart one mil, all other parameters being substantially the same, the overlapped electrode devices had a relaxation time of in the order of 1 second. The side by side electrode devices had a relaxation time in the order of 50 milliseconds.

A further advantage of the hereindescribed devices is that, depending upon the particular device being made, only one of the substrates need be provided with electrodes. Since, generally, the cost of providing a substrate having electrodes thereon is substantially unaffected by the number of arrangement of the electrodes on the substrate, providing all the electrodes on a single one only of the substrates significantly reduces the cost of the device. Various known processes, such as photolithographic processes, can be used to provide accurately positioned and dimensioned electrodes on the substrate.

Additionally, disposing the electrodes in side by side relation gives great flexibility in the design of the basic liquid crystal "cell." Heretofore, for example, the use of overlapped electrodes on oppositely disposed surfaces of the cell required, as a practical matter, that the container in which the liquid material is contained comprise a pair of flat, closely spaced substrates, the relationship of the substrates to one another being of prime importance. Using the side by side electrodes, however, the relationship to one another of the various surfaces of the liquid crystal material container are relatively unimportant. Thus, the basic "cell" can take on a variety of shapes, e.g., a transparent sphere with various side by side electrodes disposed on the inside surface thereof. Also, the electrodes can even be immersed in the liquid crystal material, e.g., the electrodes can be mounted on the end of an arm extending inwardly into the cell from a container wall.

A still further advantage of the use of side by side electrodes is that the amount of liquid crystal material between adjacent electrodes is generally much reduced in comparison with the amount of liquid crystal material between overlapped electrodes on opposite substrates. This follows because the thickness of the electrodes, in the order of $\frac{1}{25}$ mil, is much less than the distance between overlapped electrodes, in the order of $\frac{1}{2}$ mil. The smaller amount of liquid crystal material between the electrodes results in the side by side devices being operable with smaller voltages and currents than are required with overlapped electrode devices.

In the above-described embodiments of the invention, all the electrodes are disposed on a single one only of the device substrates. In another embodiment, not illustrated, each of two substrates of the device is provided with at least one pair of side by side electrodes. If, for example, each pair of electrodes is shaped to form a different image, the device can display either or both of the two images depending upon which pair of electrodes is energized.

Further, multiple pairs of side by said electrodes can be provided on each substrate and various ones of these pairs can be simultaneously or sequentially energized to obtain varying effects. Further still, the use of side by side electrodes on one substrate can be combined, within the same device, with the use of overlapped electrodes on opposite substrates, providing even greater flexibility in the type of displays obtainable.

We claim:
1. A liquid crystal display device comprising:
   a substrate, and a liquid crystal material disposed in contact with said substrate,
   a plurality of pairs of spaced, side-by-side electrodes on a surface of said substrate,
   the spacing between the electrodes of said pairs differing from pair to pair, and
   means for applying a voltage between the electrodes of each electrode pair.
2. A liquid crystal device as in claim 1, including connector means for connecting all of said electrode pairs in electrically parallel relation.
3. A liquid crystal device as in claim 1 wherein said electrode pairs are interdigitated.
4. A liquid crystal device as in claim 1 including connector means for applying the same voltage of time-dependent amplitude between the electrodes of each electrode pair whereby sequential switching of the light transmitting characteristic of different portions of said liquid crystal material adjacent to different ones of said electrode pairs is effected.

References Cited

"Dynamic Scattering: A new electrooptic effect in certain classes of nematic liquid crystals," Heilmeier et al. proceedings of the IEEE; vol. 56, No. 7; July 1968, pp. 1162–1171.

RONALD L. WIBERT, Primary Examiner

V. P. McGRAW, Assistant Examiner

U.S. Cl. X.R.
40—52; 340—324